(12) United States Patent  (10) Patent No.: US 6,604,694 B1
Kordas et al.  (45) Date of Patent: Aug. 12, 2003

(54) COANDA INJECTOR AND COMPRESSED GAS LINE FOR CONNECTING SAME

(75) Inventors: Friedel Kordas, Recklinghausen (DE); Bettina Knebel, Essen (DE); Peter Höffken, Essen (DE)

(73) Assignee: Intensiv-Filter GmbH & Co. (DE)

( * ) Notice: Subject to any disclaimer, the term of this patent is extended or adjusted under 35 U.S.C. 154(b) by 0 days.

(21) Appl. No.: 09/582,745

(22) PCT Filed: Oct. 7, 1999

(86) PCT No.: PCT/EP99/07523

§ 371 (c)(1),
(2), (4) Date: Jun. 28, 2000

(87) PCT Pub. No.: WO00/24496

PCT Pub. Date: May 4, 2000

(30) Foreign Application Priority Data

Oct. 28, 1998 (DE) .......................................... 198 49 639

(51) Int. Cl.[7] ................................................. B05B 7/04
(52) U.S. Cl. ....................... 239/398; 239/418; 239/421; 239/423; 239/424.5; 239/429; 239/DIG. 7
(58) Field of Search ................................. 239/398, 418, 239/421, 423, 424.5, 429, 433, 318, DIG. 7

(56) References Cited

U.S. PATENT DOCUMENTS

| 3,765,152 | A | * | 10/1973 | Pausch |
| 4,125,361 | A | * | 11/1978 | Bourn |
| 4,356,010 | A | * | 10/1982 | Meyer zu Riemsloh |
| 4,464,110 | A | * | 8/1984 | Boden et al. |
| 4,504,014 | A | * | 3/1985 | Leuning |

FOREIGN PATENT DOCUMENTS

| DE | 19701983 | * | 1/1997 |
| EP | 034645 | * | 2/1980 |
| WO | 95 06509 | * | 3/1995 |

* cited by examiner

Primary Examiner—Robin O. Evans
(74) Attorney, Agent, or Firm—R W Becker & Associates; R W Becker

(57) ABSTRACT

A Coanda injector is provided, and has an inlet for a medium that is to be suctioned in. A pre-chamber having at least one inlet for receiving pressurized medium for a compressed gas line is provided, and has a nozzle slot that is preferably annular in shape. An outlet is also provided for the medium to be suctioned in and for the pressurized medium. The inlet for medium to be suctioned in, and the at least one inlet of the pre-chamber, are essentially disposed in the same plane, so that the Coanda injector can be connected directly to a compressed gas line via the at least one inlet of the pre-chamber.

12 Claims, 4 Drawing Sheets

COANDA INJECTOR AND COMPRESSED GAS LINE FOR CONNECTING SAME

BACKGROUND OF THE INVENTION

The present invention relates to a Coanda injector, in particular for cleaning filter elements of dust-laden gas filters, and includes an inlet for a medium to be suctioned, a pre-chamber having at least one inlet for a pressurized medium that can be supplied via a compressed gas line and having a preferably annular nozzle slot, and an outlet for the medium to be suctioned and the pressurized medium. The invention furthermore concerns a compressed gas line for connecting such a Coanda injector.

The Coanda Effect, named for the Romanian engineer and aviation pioneer Henri Coanda, describes the property of free streams of fluid of small cross-section to conform to adjacent physical surfaces and also to follow severe changes in course of the surface contour without detaching. By feeding a small quantity of a pressurized medium, i.e., a medium with increased pressure, Coanda injectors produce a high-volume media flow of lower pressure, generally approximately ambient pressure, in accordance with the Coanda effect. The media are air, nitrogen, and other gases conventionally employed in industry.

The areas of application for Coanda injectors are extremely varied. For instance, they are used in industry to cool machine elements—such as motors and gears—and electrical switching elements, for suctioning gases and dusts that occur in industry, for transporting warm air, steam or liquid, for drying, for loosening accumulations of product, for blowing apart dust deposits, and in particular for cleaning filter elements of dust-laden gas filters—such as filter tubing, filter cartridges, filter candles, etc.—by back-washing, as is known, for example from Applicant's EP 0 034 645 B1.

In the previously known Coanda injectors, the inlet of the pre-chamber is arranged laterally for the sake of simplicity so that the inlet of the pre-chamber and the inlet for the medium to be suctioned are essentially mutually perpendicular. The connection to the compressed gas line is thus not symmetrical. This means that the pressurized medium undergoes a plurality of changes in course when traveling the flow path from the compressed gas line into the inlet of the pre-chamber, through the pre-chamber, and finally to the nozzle slot. When a pressurized medium undergoes changes in course, especially at high flow rates, this causes substantial losses in pressure, which substantially reduce the efficiency of injectors and are associated with higher energy consumption. The non-symmetrical lateral arrangement of the inlet of the pre-chamber causes a plurality of changes in course in the pressure medium's flow path, which is associated with substantial losses in pressure in the known Coanda injectors and thus reduces the efficiency of the Coanda injectors. In addition, the embodiments of the inlet of the pre-chamber known in the past are responsible for losses in pressure, which reduce efficiency, as does the conventional connecting means known in the past, e.g., tube fittings, bends, T-pieces, etc. In addition, in terms of construction, the non-symmetrical lateral arrangement of the inlet of the pre-chamber requires more space.

Given this prior art, the object of the invention is to improve a Coanda injector of the type specified in the foregoing, while avoiding the disadvantages described, such that a simple connection to a compressed gas line is possible that reduces losses in pressure and saves space.

SUMMARY OF THE INVENTION

The object is realized in accordance with the invention in that the inlet and the at least one inlet of the pre-chamber are arranged essentially in one plane so that the Coanda injector is directly connectable to the compressed gas line via the inlet of the pre-chamber.

Since the inlet of the pre-chamber is located essentially in one plane with the inlet for the medium to be suctioned, that is, in particular with only minor variations in the height, changes in course in the flow path that cause the losses in pressure are substantially reduced so that the Coanda injector in accordance with the invention has improved efficiency. In addition, the inventive configuration results in a simpler and more space-saving connection of the Coanda injector to the compressed gas line, in particular since the distance from the compressed gas line to the Coanda injector can be kept quite small.

In an advantageous embodiment of the invention, the pre-chamber is annular and surrounds the inlet for the medium to be suctioned. In a further embodiment, the pre-chamber has two mutually opposing inlets. This embodiment means the Coanda injector is centrally connectable in the direction of one of its center axes to the compressed gas line, which is associated with additional space-savings in terms of construction. In addition, the symmetrically arranged inlets of the pre-chamber improve the flow path and thus improve the efficiency of the Coanda injector in accordance with the invention.

In an additional advantageous embodiment of the invention, the inlet of the pre-chamber is provided with fluidically rounded members in the outflow region. The outflow region is primarily in the region on the flow path to the nozzle slot. The rounded members, which are embodied taking in account fluid dynamics, i.e. in a fluidic manner, prevent additional losses in pressure.

In accordance with a further advantageous embodiment of the invention, the nozzle slot is adjustable. This ensures that a defined nozzle slot required for the Coanda effect can be intentionally pre-specified. Advantageously, the pre-chamber also has an adjustable cover, which preferably has at least two spacing depressions for adjustment purposes, by means of which the height of the cover relative to the pre-chamber and therefore relative to the nozzle slot is adjustable. Advantageously, the inlet of the pre-chamber is arranged in the cover. This makes possible simple displacement of the cover without complex disassembly and assembly, especially since the inlet of the pre-chamber can be adjusted at the same time as the cover. Advantageously, the cover is joined in a gas-tight manner to the pre-chamber. There is a sufficient seal even without additional sealing means. However, additional sealing means can be used if this is required in order to reduce potential losses in pressure even further. For joining the cover to the pre-chamber, the latter is advantageously crimped around an upper edge. Of course other common connections can also be employed, such as bolts, rivets, welds, adhesives, clamps, and other connections, in particular so-called quarter-turn or bayonet fasteners. The Coanda injector is advantageously connected to the compressed gas line by welding. However, other connections can also be used.

In accordance with an additional particularly advantageous embodiment of the invention, the Coanda injector can be connected to the compressed gas line with at least one connecting member. This makes it possible to further simplify the connection, which furthermore makes possible an optimum, gas-tight connection in the manner of a material/material seal without using additional sealing materials.

Furthermore suggested with the present invention is a compressed gas line for connecting a Coanda injector in accordance with the invention, which compressed gas line is characterized in that it is provided fluidic chambers in the connection region of the inlet of the pre-chamber. This further reduces additional losses in pressure that are due to changes in course and connecting means that are unfavorable in terms of fluid mechanics.

In accordance with an additional advantageous embodiment of the invention, the compressed gas line is provided in the region of the inlet of the pre-chamber with flattened sections, whereby the connection plane to the cover then runs parallel and the disadvantages that are due to the different heights in the longitudinal and transverse directions as a result of the round cross-section of the connecting line are avoided.

BRIEF DESCRIPTION OF THE DRAWINGS

Additional details, features, and advantages of the invention result from the following description of the associated drawings that illustrate preferred embodiments of Coanda injectors in accordance with the invention, and in which.

DESCRIPTION OF PREFERRED EMBODIMENTS

Figure 1:
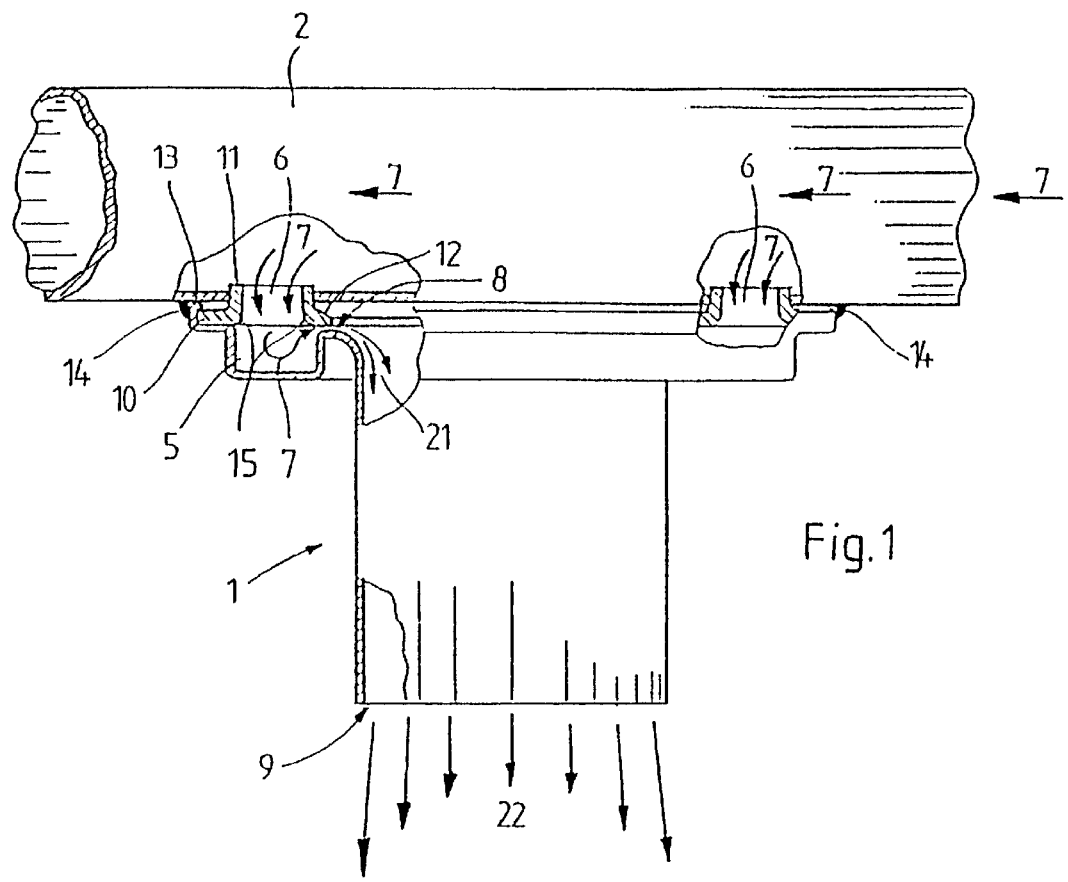
FIG. 1 is a schematic side view of an embodiment of a Coanda injector connected to a compressed gas line.
Figure 2:
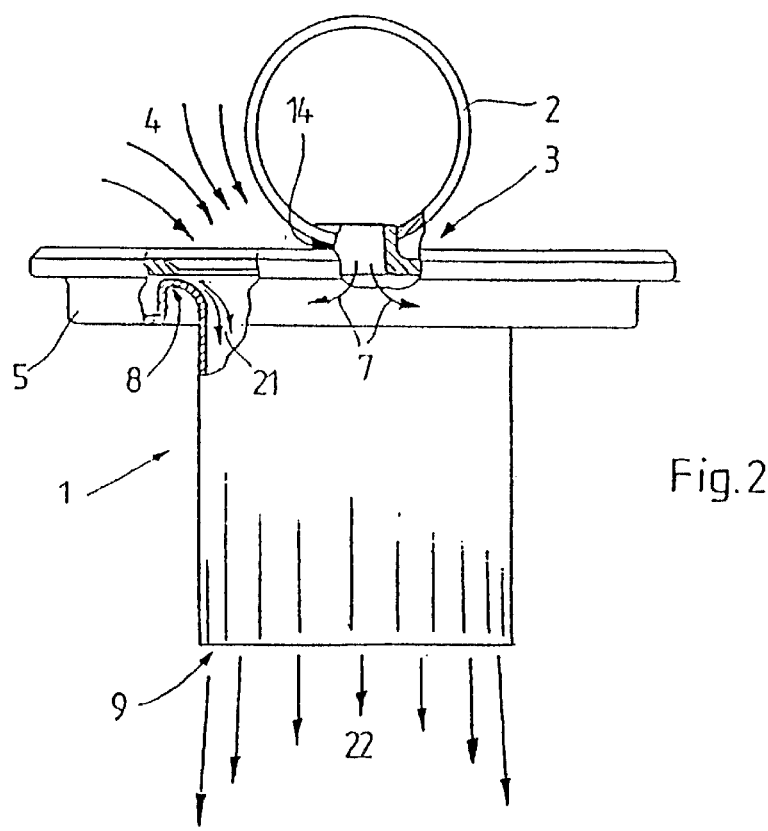
FIG. 2 is another schematic side view of the embodiment in accordance with FIG. 1.

FIGS. 1 and 2 are each schematic side views of an embodiment of a Coanda injector 1 in accordance with the invention that is connected to a compressed gas line 2. The Coanda injector 1 encompasses an annular pre-chamber 5 that surrounds an inlet 3 for a medium 4 to be drawn in or suctioned and that has two mutually symmetrically opposing inlets 6 for a pressurized medium 7 that can be fed via the compressed gas line 2 and with a preferably annular nozzle slot 8 with a profile typical for the Coanda effect and an outlet 9 for the medium 4 to be suctioned and the pressurized medium 7. The inlet 3 and the two inlets 6 of the pre-chamber 5 are essentially arranged in one plane so that the Coanda injector 1 is connected directly to the compressed gas line 2 via the two inlets 6 of the pre-chamber 5.

The pre-chamber 5 has a cover 10 into which the inlets 6 are integrated. The inlets 6 have a collar-shaped, slightly tapered elevation 11, which engage in a gas-tight manner into corresponding openings in the compressed gas line 2 without additional sealing materials being necessary. The inlets 6 of the pre-chamber 5 are provided in the fluidic outflow region with chambers or rounded portions 15 that reduce the losses in pressure due to changes in the flow course of the pressurized medium 7. The cover 10 has a cover incline 12 that is typical for the Coanda Effect. The pre-chamber 5 and the cover 10 are interconnected in a sufficiently gas-tight manner by means of crimping 13 around the upper edge of the pre-chamber 5. For assured attachment of the Coanda injector 1 to the compressed gas line 2, it is welded to the compressed gas line 2 in the region labeled 14.

Figure 3:
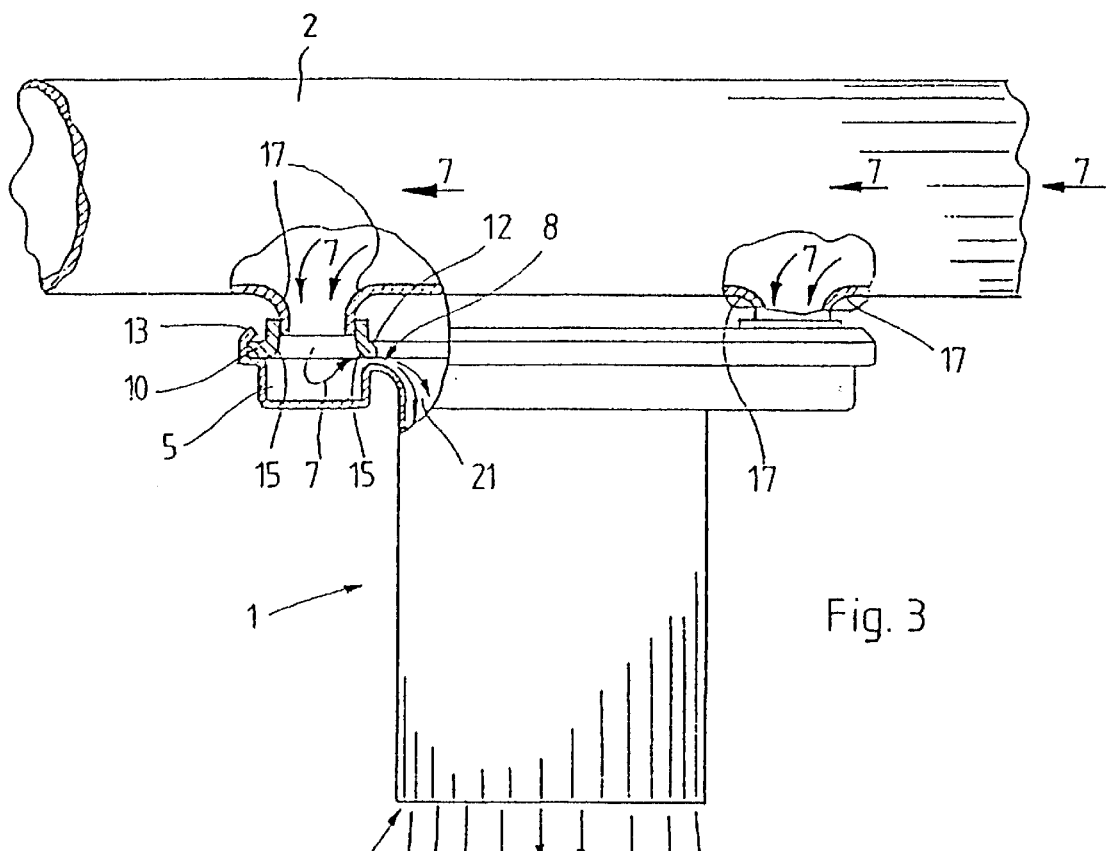
FIG. 3 is a schematic side view of another embodiment of a Goanda injector connected to a compressed gas line, similar to FIG. 1.

FIG. 3 illustrates another embodiment of a Coanda injector 1 in accordance with the invention. In this embodiment, the compressed gas line 2 is provided in the connecting region of the inlets 6 of the pre-chamber 5 with fluidic chambers or rounded portions 17 that reduce losses in pressure due to changes in course of the pressurized medium 7 in the flow path, and that are in the shape of a neck.

Figure 4:
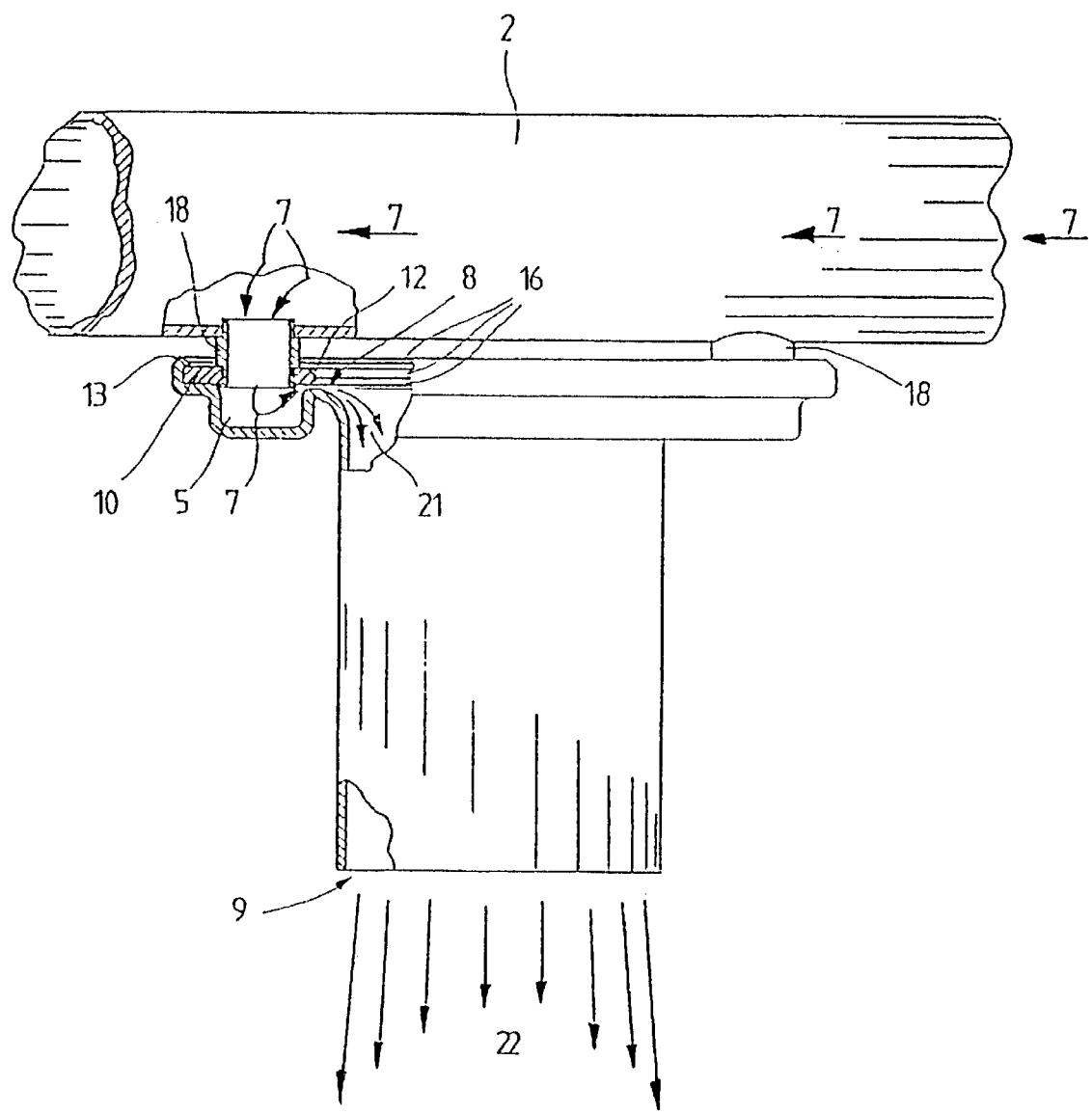
FIG. 4 is a schematic side view of another embodiment of a Coanda injector connected to a compressed gas line, similar to FIG. 1.

FIG. 4 illustrates another embodiment of a Coanda injector 1 in accordance with the invention. In this embodiment, the inlets 6 of the pre-chamber 5 are each connected to the compressed gas line 2 with a connecting member 18, which creates an optimum gas-tight material/material connection without additional sealing materials being necessary. The cover 10 is displaceable for adjusting the nozzle slot 8. In addition, the cover 10 has three spacing depressions 16 that are illustrated in more detail in FIGS. 5 and 6.

Figure 5:
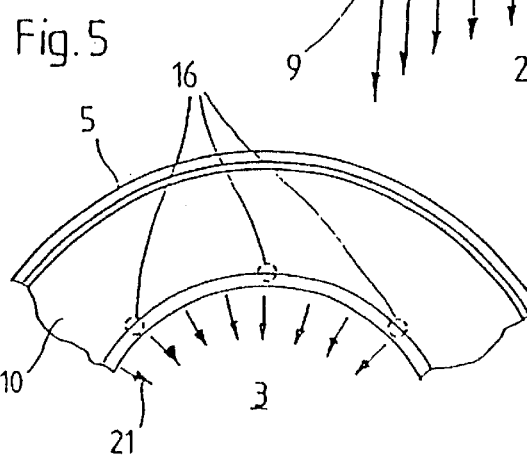
FIG. 5 is a schematic view of a part of the pre-chamber of a Coanda injector in accordance with the invention per FIG. 4.
Figure 6:
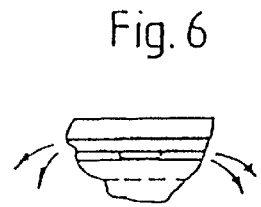
FIG. 6 is a schematic side view of a detailed segment in accordance with FIG. 5.

FIG. 5 illustrates a top view of a portion of the pre-chamber 5 of the Coanda injector 1 in accordance with FIG. 4. As can be seen in the detail in FIG. 6, which is a side view of a segment of FIG. 5, the three spacing depressions 16 are embodied as lifters on which the cover 10 in the pre-chamber 5 can be restingly arranged at different heights.

Figure 7A:
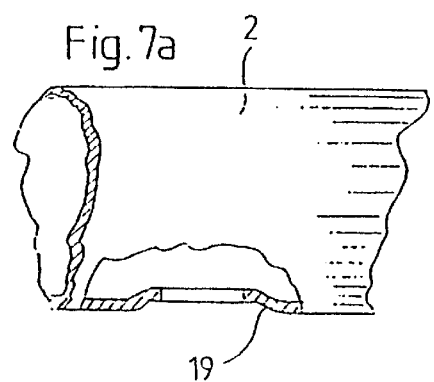
FIG. 7a is a schematic side view of an embodiment of a compressed gas line in accordance with the invention.
Figure 7B:
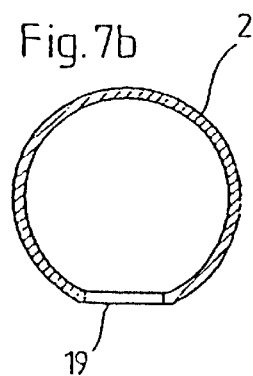
FIG. 7b is a view of the cross-section of the compressed gas line in accordance with FIG. 7a; and, FIG. 8 is a side view of a plurality of Coanda injectors in accordance with the invention connected to a compressed gas line.

FIG. 7a illustrates a schematic side view of an embodiment of a compressed gas line 2 that in the connecting region of the inlets 6 of the pre-chamber 5 is provided with a flattened section 19 that makes it possible to connect the Coanda injector 1 to the compressed gas line 2 in such a manner that the connection plane of the compressed gas line 2 runs parallel to the cover 10. This embodiment avoids the disadvantages associated with different heights in the longitudinal and transverse directions due to the round cross-section of the compressed gas line 2. FIG. 7b illustrates a view of the cross-section of the compressed gas line 2 in accordance with FIG. 7a.

Figure 8:
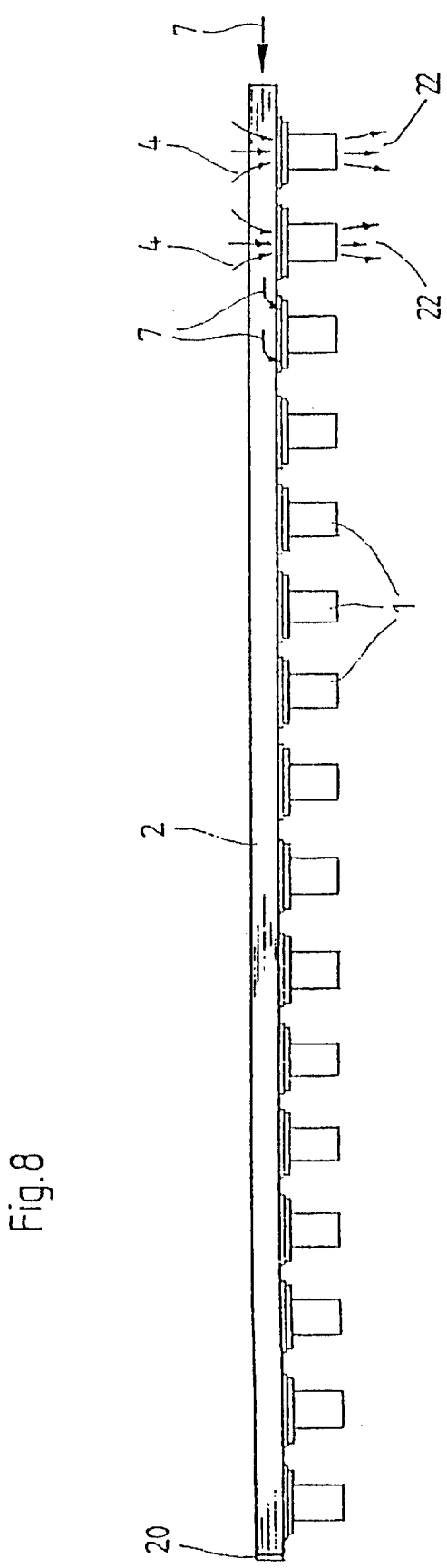

FIG. 8 illustrates a side view of sixteen Coanda injectors 1 in accordance with the invention connected to a compressed gas line 2 that is open at one end 20. The compressed gas line 2 is provided with the pressurized medium 7 from a pressurized container (not shown). In the Coanda injectors 1 connected to the compressed gas line 2, the pressurized medium 7 flows in the direction of the arrows through the compressed gas line 2 in the direction of the open end 20 and is distributed among the individual Coanda injectors 1. The pressurized medium flows through the inlets 6 into the annular pre-chamber 5 of each of the Coanda injectors 1, is distributed there, and then flows through the nozzle slot 8 in the direction of the outlet 9. In accordance with the Coanda effect, a strong edge flow 21 is produced via the profile of the nozzle slot 8, which results in an under-pressure zone in the region behind the nozzle slot 8, the result of which is that a secondary medium 4 is suctioned or drawn in and flows in the direction of flow to the outlet 9 and forms the outflow 22 made of the pressurized medium 7 and the suctioned medium 4.

The specification incorporates by reference the disclosure of German priority documents DE 198 49 639.7 of Oct. 28, 1998 and German Patent Application priority document PCT/EP99/07523 of Oct. 7, 1999.

The present invention is, of course, in no way restricted to the specification disclosure of the specification and drawings, but also encompasses any modifications within the scope of the appended claims.

Legend

1 Coanda injector
2 Compressed gas line
3 Inlet
4 Medium
5 Pre-chamber
6 Inlet
7 Pressurized medium
8 Nozzle slot
9 Outlet
10 Cover
11 Elevation
12 Cover incline
13 Crimping
14 Weld seam
15 Rounded portion
16 Spacing depressions
17 Rounded portion
18 Connecting piece
19 Flattened section
20 End
21 Edge flow
22 Outflow

What we claim is:

1. A Coanda injector comprising:

fluid-conveying means having an inlet for a medium to be suctioned in, and an outlet, and an annular pre-chamber that surrounds said inlet of said fluid-conveying means and has two mutually oppositely disposed inlets for receiving pressurized medium from a compressed gas line, and that has an annular nozzle slot for establishing flow communication between said pre-chamber and said inlet of said fluid-conveying means, wherein said inlet of said fluid-conveying means, and said two inlets of said pre-chamber, are essentially disposed in the same plane, so that said Coanda injector is centrally connectable directly to a compressed gas line via said two inlets of said pre-chamber, and wherein said pre-chamber is provided with means for connecting said injector to said compressed gas line such that gas from said gas line flows downwardly into said pre-chamber.

2. A Coanda injector according to claim 1, wherein said at least one inlet of said pre-chamber is provided with fluidic rounded portions in an outflow region thereof.

3. A Coanda injector according to claim 1, wherein said nozzle slot is adjustable.

4. A Coanda injector according to claim 3, wherein said pre-chamber has an adjustable cover to effect adjustability of said nozzle slot.

5. A Coanda injector according to claim 4, wherein said cover is provided with at least two spacing depressions to effect adjustment of said cover.

6. A Coanda injector according to claim 4, wherein said at least one inlet of said pre-chamber is disposed in said cover.

7. A Coanda injector according to claim 6, wherein said cover is connected to said pre-chamber in a gas-tight manner.

8. A Coanda injector according to claim 1, which is welded to said compressed gas line.

9. A Coanda injector according to claim 1, wherein at least one connecting piece is provided for attachment of said injector to said compressed gas line.

10. A compressed gas line for connection to the Coanda injector of 1, wherein in the connection region of said at least one inlet of said pre-chamber, said compressed gas line is provided with fluidic rounded portions.

11. A compressed gas line according to claim 10, wherein said gas line is provided with flattened sections at least in the connecting region of said at least one inlet of said pre-chamber.

12. A Coanda injector according to claim 1, wherein a plurality of such injectors are connectable to said compressed gas line.

* * * * *